US010949207B2

(12) United States Patent
Opferman et al.

(10) Patent No.: US 10,949,207 B2
(45) Date of Patent: Mar. 16, 2021

(54) PROCESSOR CORE SUPPORTING A HETEROGENEOUS SYSTEM INSTRUCTION SET ARCHITECTURE

(71) Applicant: Intel Corporation, Santa Clara, CA (US)

(72) Inventors: Toby Opferman, Beaverton, OR (US); Russell C. Arnold, Fountain Hills, CA (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 16/147,702

(22) Filed: Sep. 29, 2018

(65) Prior Publication Data

US 2019/0042258 A1    Feb. 7, 2019

(51) Int. Cl.
*G06F 9/30* (2018.01)
*G06F 9/455* (2018.01)

(52) U.S. Cl.
CPC ...... *G06F 9/30196* (2013.01); *G06F 9/30145* (2013.01); *G06F 9/45508* (2013.01); *G06F 9/45533* (2013.01)

(58) Field of Classification Search
CPC .......................... G06F 9/30145; G06F 9/30196
See application file for complete search history.

(56) References Cited

U.S. PATENT DOCUMENTS

| 2014/0082630 | A1 | 3/2014 | Ginzburg et al. |
| 2014/0095832 | A1* | 4/2014 | Haber ................. G06F 9/45558 |
| | | | 712/205 |
| 2015/0007196 | A1 | 1/2015 | Toll et al. |
| 2018/0107489 | A1 | 4/2018 | Gao et al. |
| 2018/0267807 | A1* | 9/2018 | Burger ................. G06F 9/4806 |

FOREIGN PATENT DOCUMENTS

WO    2018/125250 A1    7/2018

OTHER PUBLICATIONS

European Search Report and Search Opinion, EP App. No. 19182744.3, dated Dec. 12, 2019, 12 pages.
Li T., et al., "Operating system support for overlapping-ISA heterogeneous multi-core architectures," HPCA-16 2010 The Sixteenth International Symposium on High-Performance Computer Architecture. IEEE, 2010, 12 pages.

* cited by examiner

*Primary Examiner* — Zachary K Huson
(74) *Attorney, Agent, or Firm* — Nicholson De Vos Webster & Elliott LLP

(57) ABSTRACT

Embodiments of processors, methods, and systems for a processor core supporting a heterogenous system instruction set architecture are described. In an embodiment, a processor includes an instruction decoder and an exception generation circuit. The exception generation circuit is to, in response to the instruction decoder receiving an unsupported instruction, generate an exception and report an instruction classification value of the unsupported instruction.

17 Claims, 9 Drawing Sheets

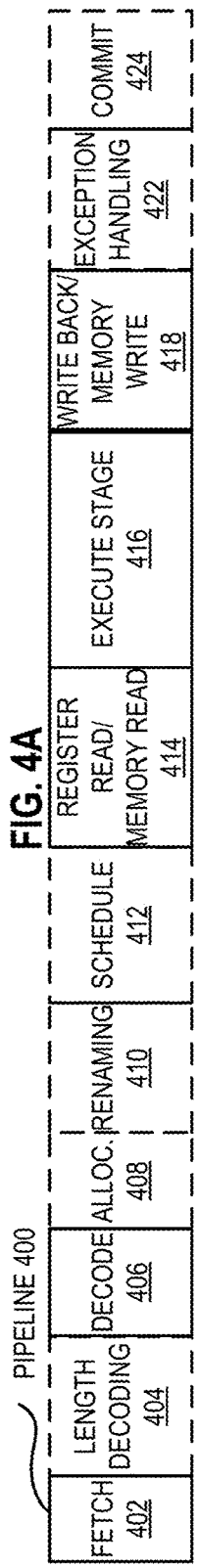
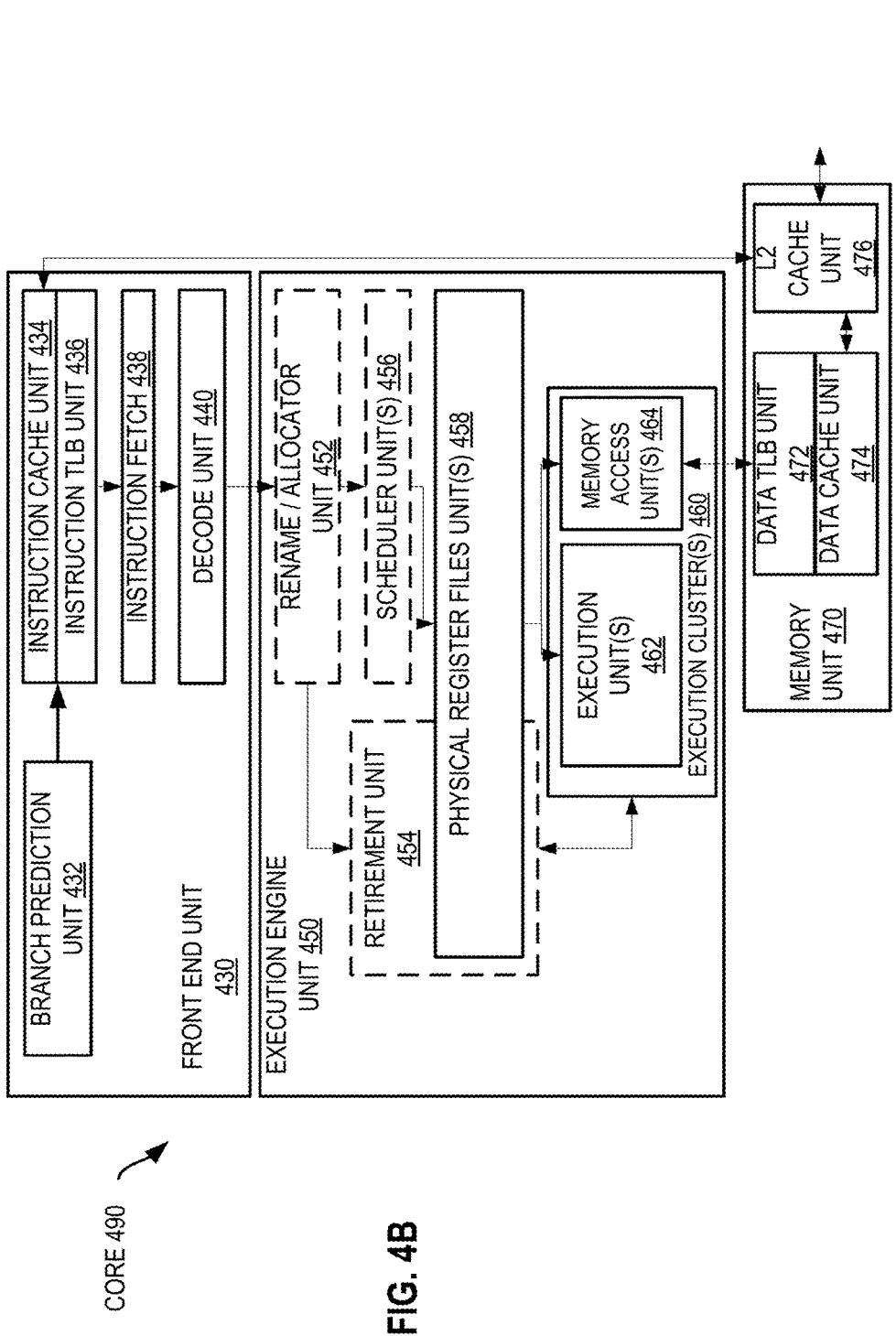

PROCESSOR CORE SUPPORTING A HETEROGENEOUS SYSTEM INSTRUCTION SET ARCHITECTURE

FIELD OF INVENTION

The field of invention relates generally to computer architecture, and, more specifically, but without limitation, to processor core design.

BACKGROUND

A computer system may include multiple processors and/or processor cores, each having an instruction set architecture (ISA) according to which it executes instructions issued or provided to it and/or the system by software, including application and/or user-level software, system software (e.g., an operating system (OS), virtual machine monitor (VMM), hypervisor, etc.), and/or any other software, program, code, etc.

A processor and/or processor core may generate an exception, sometimes referred to as an undefined operation code (opcode) exception, invalid opcode fault, and/or #UD, in response to a core decoding, attempting to decode, or otherwise receiving an instruction that is not in its ISA.

BRIEF DESCRIPTION OF THE DRAWINGS

The present invention is illustrated by way of example and not limitation in the figures of the accompanying drawings, in which like references indicate similar elements and in which:

FIG. 4A is a block diagram illustrating both an exemplary in-order pipeline and an exemplary register renaming, out-of-order issue/execution pipeline according to embodiments of the invention;

FIG. 4B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
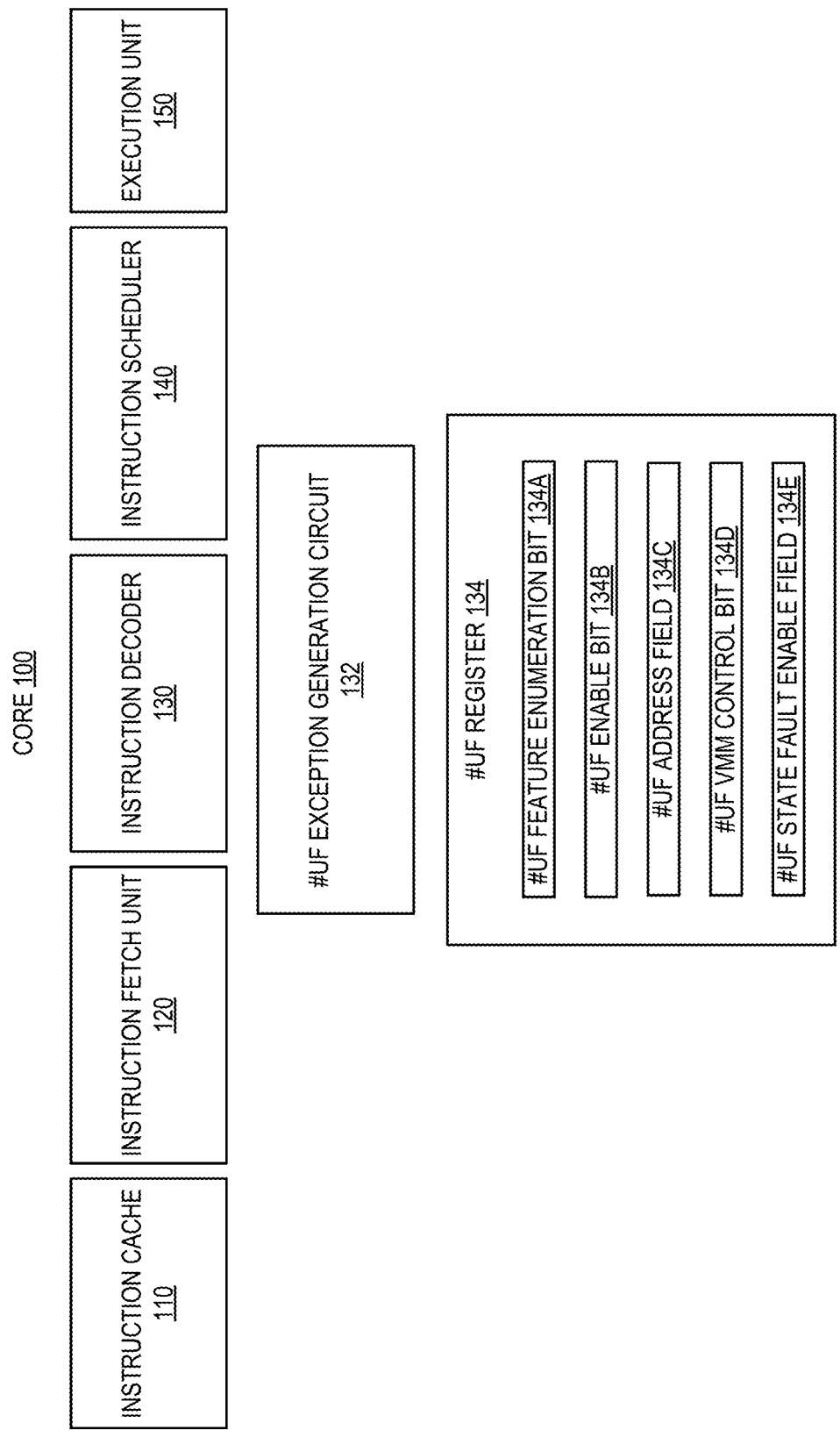
FIG. 1 is a diagram illustrating a processor core according to an embodiment of the invention.

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the invention, a "/" character between terms may mean that an embodiment may include or be implemented using, with, and/or according to the first term and/or the second term (and/or any other additional terms).

As discussed in the background section, a computer system may include multiple cores, each having an instruction set architecture (ISA) according to which it executes instructions issued or provided to it and/or the system by software. In this specification, the use of the term "instruction" is meant to refer to this type of instruction (which may also be called a macro-instruction or an ISA-level instruction), as opposed to: (1) a micro-instruction or micro-operation that may be provided to execution and/or scheduling hardware as a result of the decoding (e.g., by a hardware instruction-decoder) of a macro-instruction, and/or (2) a command, procedure, routine, subroutine, or other software construct, the execution and/or performance of which involves the execution of multiple ISA-level instructions.

In some such systems, different cores may have different ISAs. Therefore, a system may include a first core with hardware, hardwiring, microcode, control logic, and/or other micro-architecture designed to execute particular instructions according to a particular ISA (or extensions to or other subset of an ISA), and the system may also include a second core without such micro-architecture. In other words, the first core may be capable of executing those particular instructions without any translation, emulation, or other conversion of the instructions (except the decoding of macro-instructions into micro-instructions and/or micro-operations), whereas the second core is not. In that case, that particular ISA (or extensions to of subset of an ISA) may be referred to as supported (or natively supported) by the first core and unsupported by the second core, and/or the system may be referred to as having a heterogeneous ISA.

In addition to and/or instead of the #UD exception described in the background section, a core according to an embodiment of the invention may generate an exception, referred to in this specification as an unimplemented instruction fault or #UF, as further described below. In some embodiments, instructions that generate such exceptions are then migrated by an operating system to hardware that supports the instruction, or emulated to run on the hardware that generated the exception. This does not interfere with existing code paths such as #UD handler and does not require any software decoding of opcodes nor the need for the OS to keep a list of opcodes.

FIG. 1 is a diagram illustrating a core according to an embodiment of the invention. Core 100 in FIG. 1 may be implemented in logic gates and/or any other type of circuitry, all or parts of which may be included in a discrete component and/or integrated into the circuitry of a processing device or any other apparatus in a computer or other information processing system. For example, core 100 in FIG. 1 may correspond to or be included in any of core 490 in FIG. 4B, cores 502A to 502N in FIG. 5, processors 610 and 615 in FIG. 6, processors 770 and 780 in FIGS. 7 and 8, and/or cores 902A to 902N in FIG. 9, each as described below.

Core 100 includes instruction cache 110, instruction fetch unit 120, instruction decode unit 130, instruction scheduler 140, and execution unit 150. Core 100 may include any number of each of these elements (e.g., multiple execution units) and/or any other elements not shown in FIG. 1. Furthermore, embodiments of the invention may exclude elements shown in FIG. 1 (e.g., a core according to an embodiment may be implemented without an instruction cache).

Instruction cache 110 may represent and/or include a memory to store instructions to be decoded and/or executed by core 100. Instruction fetch unit 120 may represent and/or include instruction fetch circuitry and/or hardware to fetch instructions (e.g., from instruction cache 110) to be decoded and/or executed by core 100. Instruction decode unit 130 may represent and/or include the circuitry and/or hardware of an instruction decoder. Instruction scheduler 140 may represent and/or include circuitry and/or hardware to schedule instructions for execution by core 100. Execution unit 150 may represent and/or include circuitry and/or hardware to execute instructions. Further description of each of these elements may be found in the descriptions of corresponding elements in the processor and/or system embodiments described below.

In an embodiment of the invention, core 100 also includes #UF generation circuit 132 that generates an exception in response to decoding, attempting to decode, and/or other receiving an instruction unsupported by core 100 itself. In embodiments, the instruction may be supported by another core in the system that includes core 100 and/or may be emulated by a software or firmware module in system 100. #UF generation circuit 132, may be included in and/or share circuitry with any other exception generation circuitry or hardware within core 100. In an embodiment, an unimplemented instruction exception may be generated in response to decoding or receiving an instruction having an opcode that is not in the ISA of core 100 but may be in the ISA of a different core in the system that includes core 100.

Core 100 may include a #UF register 134, which may represent a register or other storage location (or any field or other portion thereof, and/or any number of different registers or storage locations or fields or portions thereof), such as a control, configuration, model-specific, or machine-specific register, that may be configured or programmed, e.g., by system software, to provide for core 100 to correctly generate undefined opcode exceptions and/or unimplemented instruction exceptions. In embodiments, #UF register 134 may include a #UF feature enumeration indicator or bit 134A to indicate whether a #UF feature is supported by the system (e.g., for enumeration of features using a CPUID instruction); a #UF enable indicator or bit 134B to be set to enable #UF generation circuit 132 to generate unimplemented instruction faults and, when not set, to disable #UF generation circuit 132 (and, e.g., generate or allow generation of invalid opcode faults instead); a #UF address field 134C as described below; and a #UF VMM control indicator or bit 134D as described below.

In embodiments, generation of an unimplemented instruction fault may include reporting information (#UF information) to system software (e.g., the OS) regarding the system's support for the instruction. For example, the information may be used by the OS to determine how to handle the #UF (e.g., migrate the instruction's thread or other code sequence to a different core for execution, use a software or firmware module to emulate the instruction, etc.), without requiring the OS to decode or look up the instruction and/or determine if and/or how the instruction could be handled (e.g., executed by a different core, emulated, treated as a no-operation instruction, etc.) by the system, thus providing for the system to handle a #UF more efficiently than a #UD.

The #UF information may include a #UF error code, reported according to any desired exception error code reporting technique, and/or #UF extended information, each as described below. In an embodiment, #UF configuration register may include #UF address field 134C, which may be used to indicate where #UF information (e.g. #UF extended information or any portion thereof) is to be stored by #UF generation circuit 132 and may be found by the OS. For example, as part of the configuration of the system by a basic input/output system (BIOS), the OS, or other system software, an address of a location (#UF information location) in a system memory, to be designated for #UF extended information, may be written to #UF address field 134C. Although unimplemented instruction faults are not re-entrant on the faulting thread, this address may be context-switched (e.g., using state save/restore instructions).

In an embodiment, the #UF error code field may include a fault type indicator and an instruction classification field. The fault type indicator may be a single bit to indicate whether: (e.g., when '1') the #UF was generated because the instruction is not implemented on the decoding core (a #UF instruction fault), or (e.g., when '0') the #UF was generated because execution of the instruction would involve saving or restoring state that is not implemented on the decoding core (a #UF state fault, as further described below).

The instruction classification field may be any number of bits (e.g., 20) to store a value to represent a group or classification that includes the faulting instruction. In an embodiment, instruction classification values may be specified and determined as part of the specification and execution of a core identification instruction (e.g., CPUID). For example, various instruction classifications may be enumerated in a CPUID leaf in which each bit represents a different classification (and, for example, the ordering of bits may begin at bit 0 of a sublcaf 0), and the instruction classification value reported by a #UF indicates the bit that represents the faulting instruction's classification. Therefore, the OS may use the reported instruction classification value and the CPUID instruction to find a core on the system that supports the faulting instruction, then migrate the faulting instruction's thread to that core. Alternatively, the OS may use system-provided software or firmware to emulate the faulting instruction, as described below.

Figure 2:
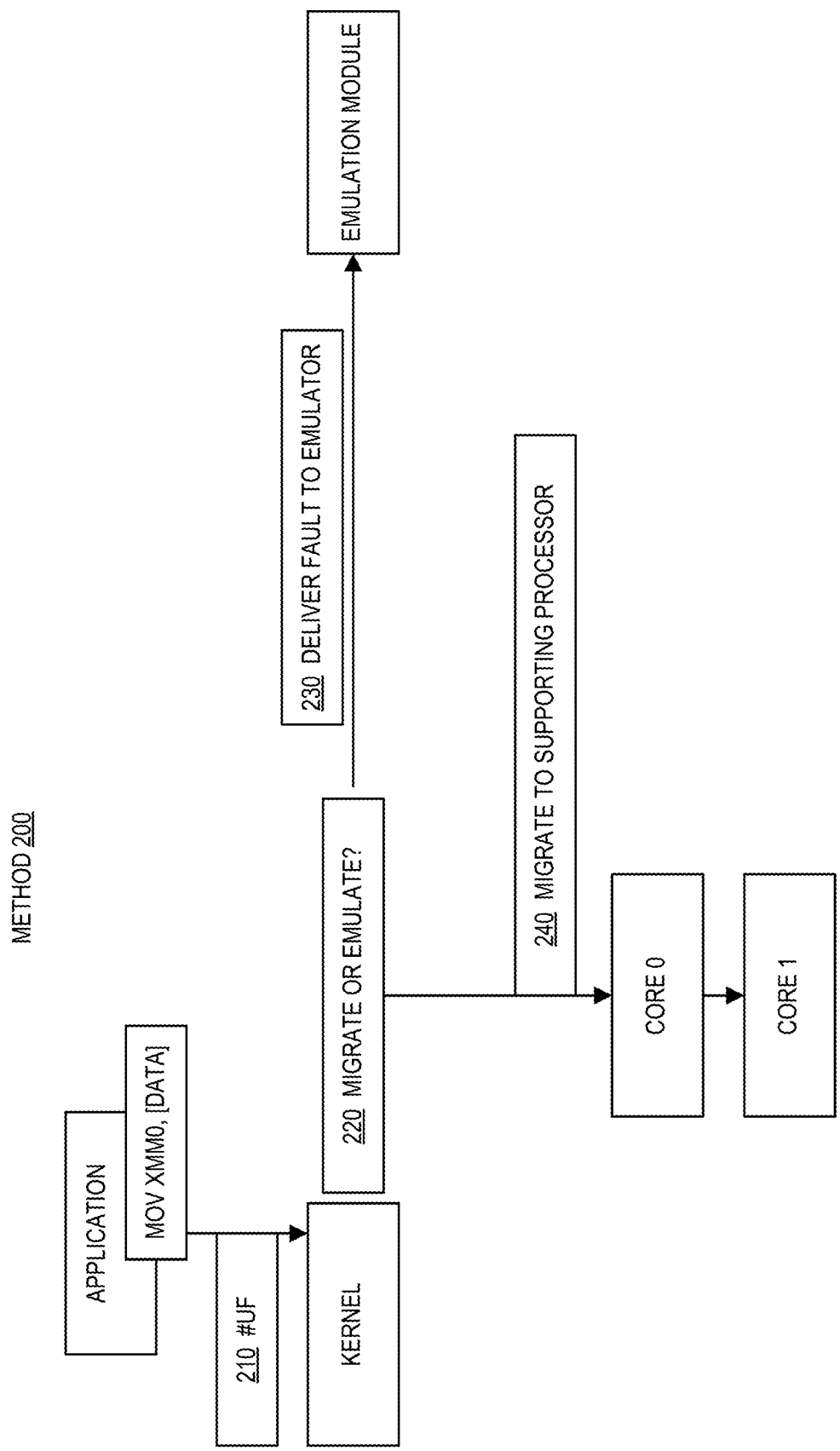
FIG. 2 is a diagram illustrating a method for generating and handling an unimplemented instruction fault according to an embodiment of the invention.

FIG. 2 illustrates a method 200 for generating and handling a #UF according to an embodiment of the invention. In 210, a #UF is generated as a result of an application attempting to execute an unsupported instruction (e.g., MOV XMM0, [Data]). In 220, the OS determines whether to migrate the faulting thread or emulate the faulting instruction. In 230, the OS invokes an emulation module to emulate the faulting instruction. Alternatively, in 240, the OS migrates the faulting thread to a core that supports the faulting instruction.

In an embodiment, the #UF extended information may include the information about the faulting instruction shown in Table 1. This information and/or any other information reported by the #UF may be extracted from the defaulting instruction and written to the #UF information location by the decoding core (e.g., by decode unit 130 and/or #UF generation circuit 132). Then, the location of the #UF extended information (e.g., from #UF address field 134C) and/or the information itself may be passed (e.g., by the OS) to the core and/or context to or by which the faulting instruction is migrated or emulated, along with the location (s) of and/or state information associated with the faulting instruction and/or its thread.

TABLE 1

| #UF Extended Information | Size (e.g.) | Description |
| --- | --- | --- |
| Instruction Size | 2 Bytes | The size of the instruction may be used for emulation, to increment to the next instruction after the emulated instruction. |
| Opcode Size | 1 Byte | The size of the opcode. |
| Number of Operands | 1 Byte | The number of opcodes the instruction contains. |
| Opcode | Variable | The base opcode that faulted. |
| Operand 1 Type | 1 Byte | The type of operand (e.g.): 0 - General Purpose Register 1 - Single Instruction Multiple Data (e.g., AVX) Register 2 - Immediate 3 - Memory Reference ... |
| Operand 1 Data ... | Variable | |
| Operand n Type | 1 Byte | The type of operand. |
| Operand n Data | Variable | |

As discussed above, the #UF information may include an instruction classification value. A CPUID leaf (hetero leaf) may be provided for enumeration of the instruction classifications that a core supports. Each bit of the hetero leaf and/or its subleaves may be defined to correspond to a particular group or classification of instructions, and for a particular core, the bits corresponding to the instruction classifications supported by that core may be set. An OS may query the CPUID hetero leaf of cores in a system to find a core that supports a particular instruction.

For example, a system may include four cores, referred to as core A, core B, core C, and core D, with the instruction classifications defined as in Table 2 and the cores reporting the CPUID hetero leaf information shown in Table 3.

TABLE 2

| Classification Bit | Description |
| --- | --- |
| 0 | XMM |
| 1 | SSE2 |
| 2 | AVX512 |
| 3 | TMUL |
| 4 | VNNI |
| 5 | AES-NI |

TABLE 3

| Core | Hetero Leaf Bit Values |
| --- | --- |
| A | 00000011 |
| B | 00000011 |
| C | 00000111 |
| D | 00111111 |

Then, for example, if an AES-NI instruction is issued to core A, core A would fault with a #UF error code instruction classification value of '00100000' and the OS could use the CPUID instruction to find that the faulting thread may be migrated from core A to core D.

Embodiments may include features to support #UFs in a virtualized environment. For example, #UF VMM control bit 134C may be used to configure and determine whether a VMM or a guest OS is to handle #UFs generated within virtual machine.

In an embodiment (e.g., when #UF VMM control bit 134C is '0'), a VMM may allow #UFs to be handled within virtual machines (VMs). In this embodiment, the VMM would use the CPUID instruction to find the instruction classifications supported by physical cores in the system, then assign one or more of each of these instruction classifications to one or more virtual processors (VPs), then allow a guest OS to either migrate the faulting thread to a VP that supports the faulting instruction or else to emulate the faulting instruction. In this embodiment, #UF address field 134C may be used to store a guest, virtual, or linear address.

In an embodiment (e.g., when #UF VMM control bit 134C is '1'), a VMM would intercept #UFs and, transparently to the VM, either migrate the faulting thread to a VP that supports the faulting instruction or emulate the faulting instruction. In this embodiment, #UF address field 134C may be used to store a host, physical, or system address.

Embodiments may also include #UF generation (a #UF state fault) by a core in response to an attempt to execute a state management instruction (e.g., state save instruction, state restore instruction) on state information and/or state information storage locations unsupported by or unimplemented in the core but may be supported by or implemented in another core in the system.

In some embodiments, in response to a state save instruction on a core that does not support instruction classifications supported by another core in the system, state save area corresponding to those instruction classifications may be ignored, instead of generating a #UF state fault, to provide for faster thread switching and/or privilege ring/level transitions. In this case, the OS may provide the missing state information to an emulation module when emulating these instructions.

In various embodiments, #UF state faults may be enabled based on privilege level. For example, by configuration of a #UF state fault enable indicator/field (e.g., a bit/field 134E in #UF register 134) and/or by default (including in embodiments that do not include a #UF state fault enable indicator/field). Embodiments may include any combination of enabling #UF state faults only at an application or user privilege level (e.g., ring 3); at any privilege level less privileged than a most privileged level (e.g., any privilege level other than ring 0); always at application or user privilege level, plus, when a particular enable bit is set, at a more privileged level (e.g., the particular enable bit may be toggled by the OS to provide for the OS to selectively enable #UF state faults based on the type of system software that is being executed and/or whether the system software uses information from the unsupported state save location), etc.

Embodiments may include various features to support efficient delivery and handling of #UF instruction and/or state faults. A core may be designed to deliver page faults associated with the faulting instruction (e.g., if the instruction crosses a page boundary, the instruction is on a not present or not executable page, etc.) before the #UF and/or its fault handler is invoked. Issues related to execution of the instruction (e.g., exceptions or faults other than page faults and the #UF) would not be delivered and/or handled until after the faulting thread is migrated or emulated.

Embodiments may include various feature to support emulation of instructions that generate a #UF. The emulator may choose to prevent context switching by clearing interrupts or raising the task priority. If the emulator updates state that is then migrated to a core that natively supports the faulting instruction, the emulator is responsible for updating state on that core, in a way that avoids faults and subsequent re-entry into the hardware fault handler.

Embodiments may include various features to support the use of debug breakpoints. Although software and hardware instruction breakpoints may behave as expected in cores that generate #UFs according to embodiment of the inventions (e.g., these breakpoints will occur before the #UF is delivered or handled), embodiments may include special handling of hardware data breakpoints. To emulate a faulting instruction, an embodiment may include supplying the emulation module with a list of hardware data breakpoints so that if the data is accessed during emulation, the breakpoint is delivered after the emulation (e.g., by the emulation module setting the appropriate bits in a debug register and directly calling the debug fault).

Figure 3:
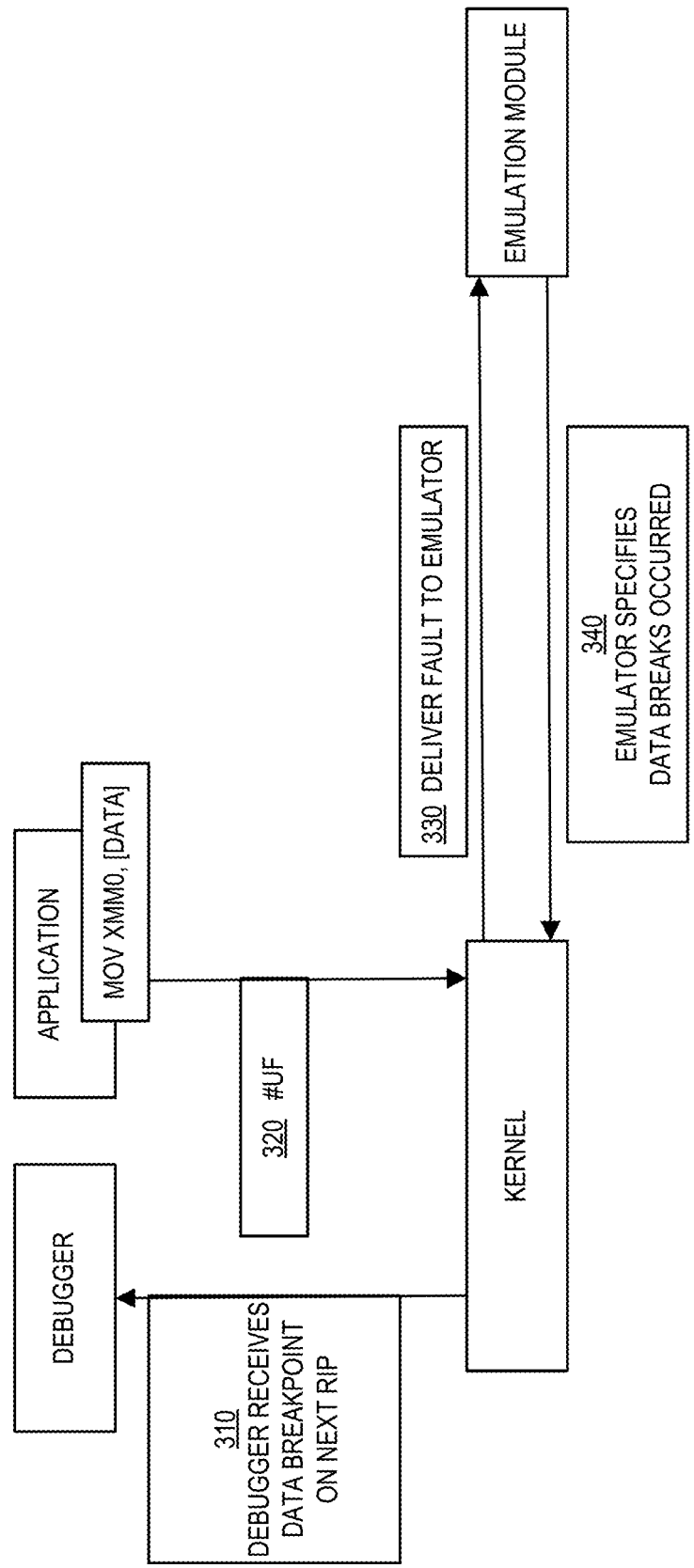
FIG. 3 is a diagram illustrating a method for handling a hardware data breakpoint according to an embodiment of the invention.

FIG. 3 illustrates a method 300 for handling a hardware data breakpoint according to an embodiment of the invention. In 310, a debugger receives a hardware data breakpoint. In 320, a #UF is generated as a result of an application attempting to execute an unsupported instruction (e.g., MOV XMM0, [Data]). In 330, the OS invokes an emulation module to emulate the faulting instruction. In 340, the emulator reports that the hardware data breakpoint occurred during emulation of the faulting instruction.

Exemplary Core Architectures, Processors, and Computer Architectures

The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front-end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general-purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
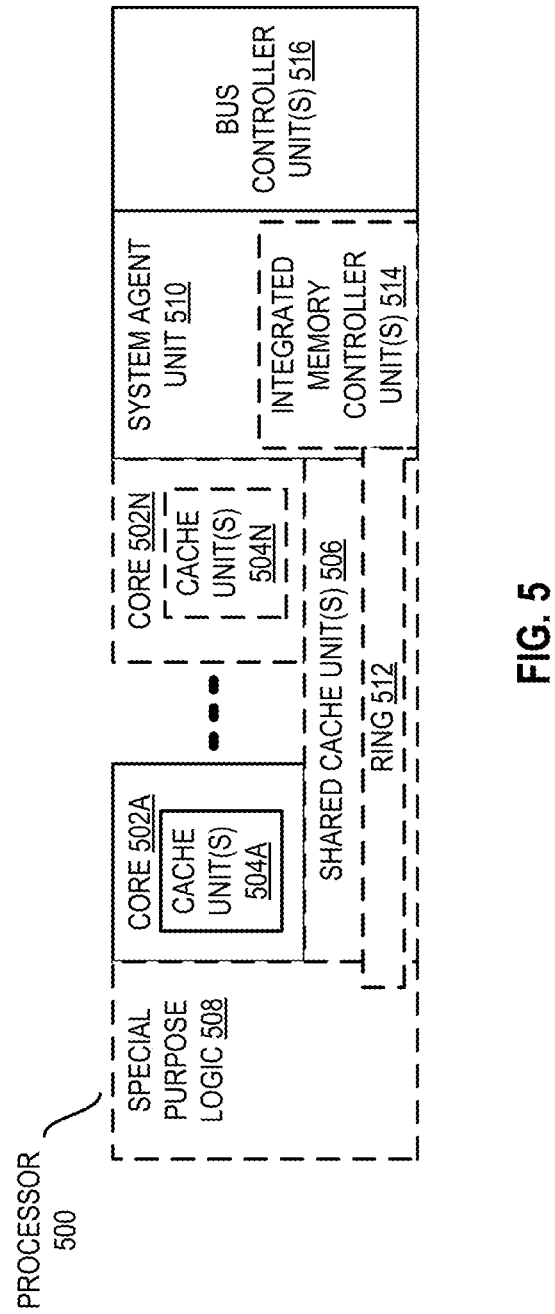
FIG. 5 is a block diagram of a processor that may have more than one core, may have an integrated memory controller, and may have integrated graphics according to embodiments of the invention.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring-based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502-A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
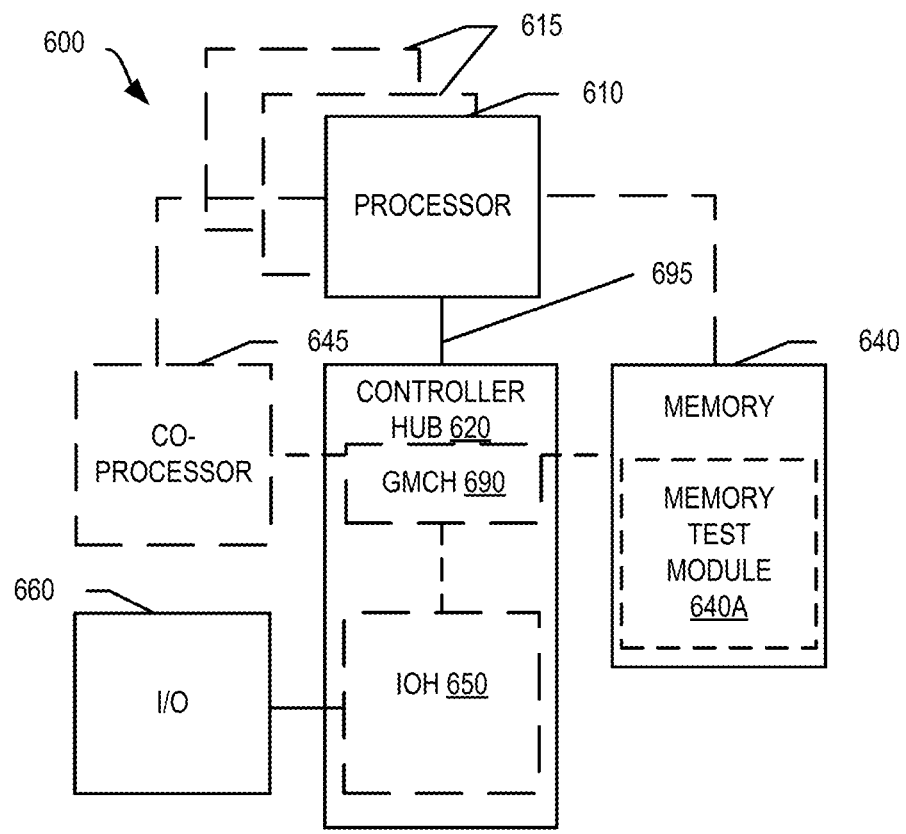
FIG. 6 is a block diagram of a system in accordance with one embodiment of the present invention.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random-access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
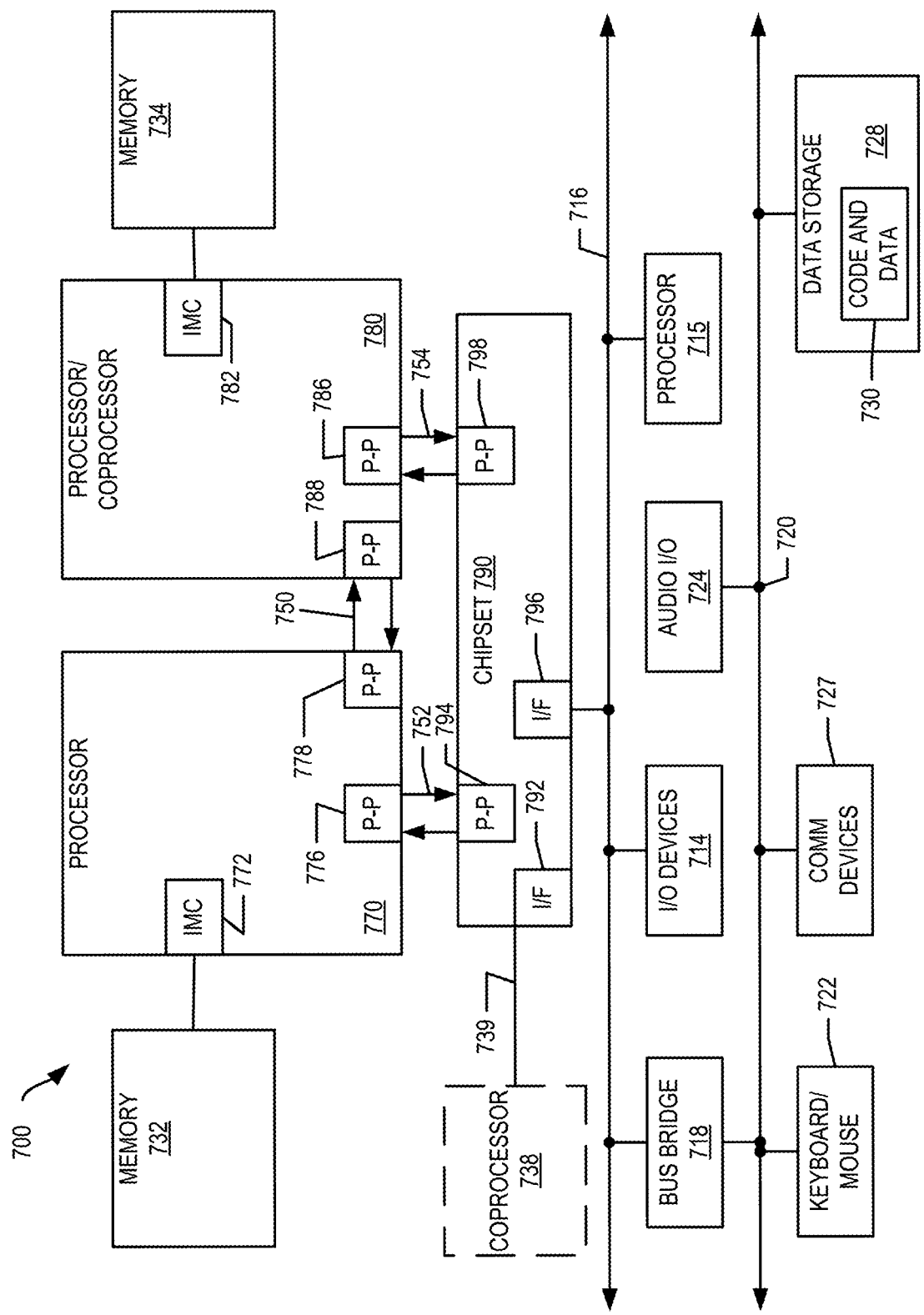
FIG. 7 is a block diagram of a first more specific exemplary system in accordance with an embodiment of the present invention.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller unit's point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
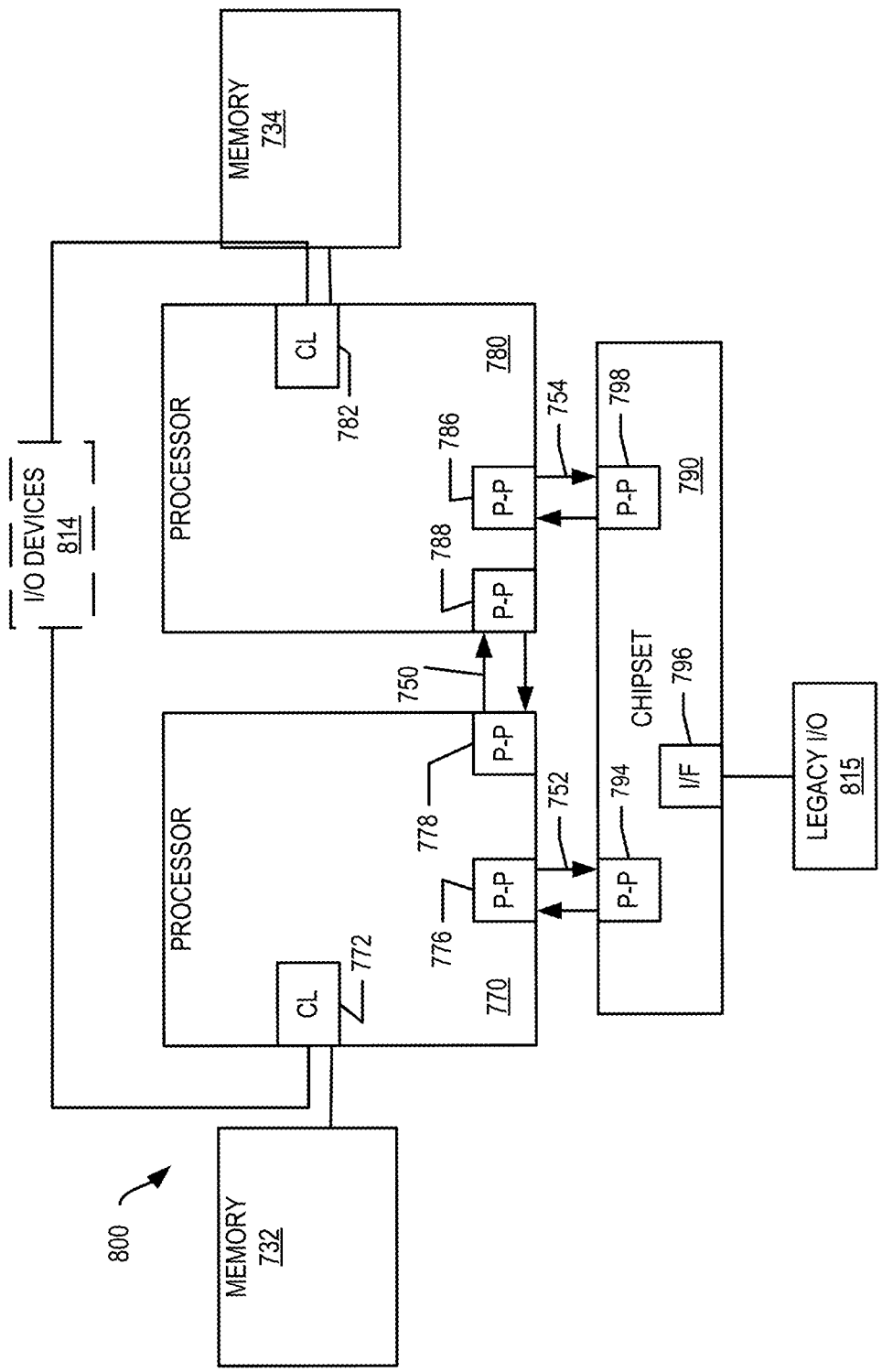
FIG. 8 is a block diagram of a second more specific exemplary system in accordance with an embodiment of the present invention.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
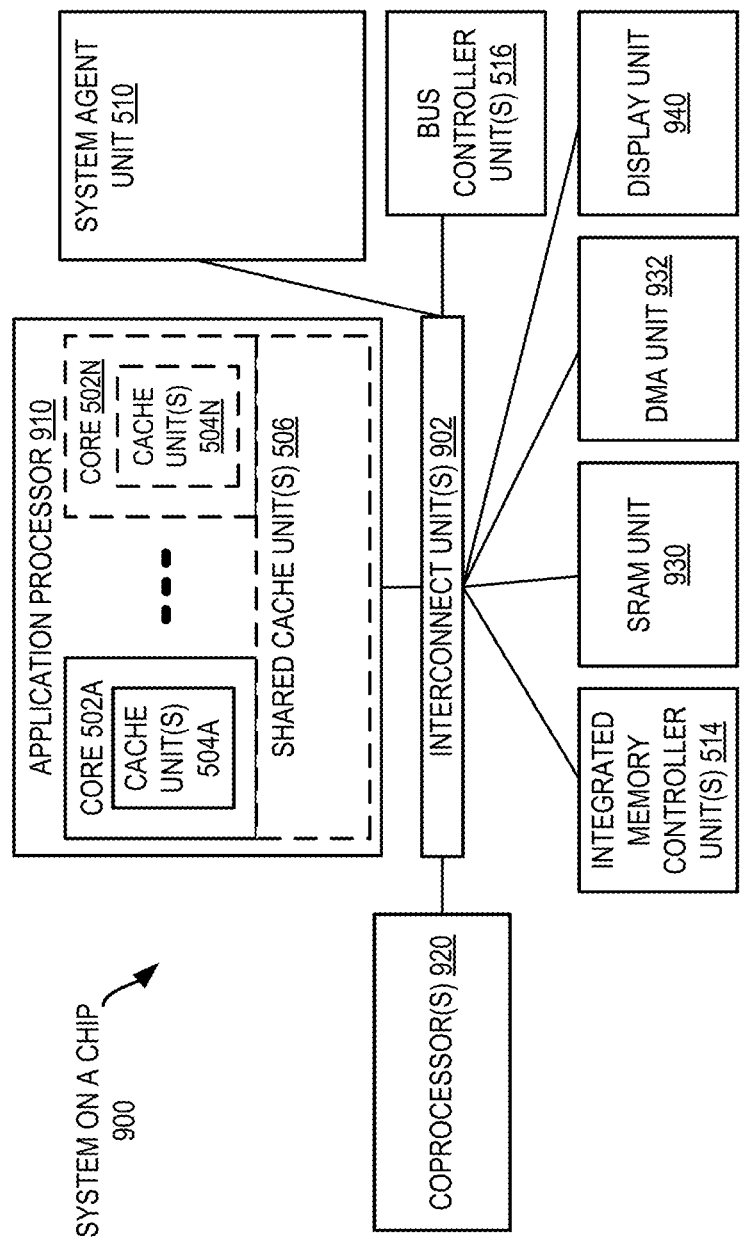
FIG. 9 is a block diagram of a SoC in accordance with an embodiment of the present invention.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In an embodiment, a processor includes an instruction decoder and an exception generation circuit. The exception generation circuit is to, in response to the instruction decoder receiving an unsupported instruction, generate an exception and report an instruction classification value of the unsupported instruction.

In various embodiments, any or any combination of the following may also apply. The instruction classification value may be to indicate a classification of instructions including the unsupported instruction. The classification of instructions may be an extension to an instruction set architecture. The processor may be a first processor in a system, the system also including a second processor, the second processor supporting the unsupported instruction. The second processor may be to indicate support for the unsupported instruction in response to a processor identification instruction. The processor may also comprise a register to store an address of a memory location, the processor to store information regarding the unsupported instruction in the memory location. The processor may also comprise a register to store an indicator to indicate whether a virtual machine monitor or guest software is to handle the exception when generated within a virtual machine. The exception generation circuit may also be to generate the exception in response to a state management instruction to save or restore unsupported state information. The exception generation circuit may also be to determine whether to generate the exception in response to the state management instruction based on a privilege level of software including the state management instruction.

In an embodiment, a method may include receiving, by a first processor in a system, a first instruction, the first processor having a first instruction set architecture; generating, by the first processor, an exception in response to determining that the first instruction is not in the first instruction set architecture; and reporting an instruction classification of the first instruction.

In various method embodiments, any or any combination of the following may also apply. The method may also include determining that the first instruction is in a second instruction set of a second processor in the system. Determining that the first instruction is in the second instruction set may include issuing a second instruction to the second processor, the second instruction to enumerate supported instruction classifications. The method may also include migrating a thread including the first instruction to the second processor in response to the exception. The method may also include emulating the first instruction in response to the exception. The method may also include storing information regarding the first instruction in a memory location specified by an address in a register in the first processor. The exception may be generated in a virtual machine, and the method may also include determining whether a virtual machine monitor or guest software is to handle the exception.

In embodiments, an apparatus may include means for performing any of the methods described above. In embodiments, a machine-readable tangible medium may store instructions, which, when executed by a machine, cause the machine to perform any of the methods described above.

In an embodiment, a system may include a first processor having a first instruction set architecture (ISA) including a first instruction and a second processor having a second ISA not including the first instruction. The second processor may include an instruction decoder; and an exception generation circuit to, in response to the instruction decoder receiving the instruction, generate an exception and report an instruction classification value of the instruction.

In system embodiments, as in apparatus and other embodiments, any or any combination of the following may also apply. The instruction classification value may be to indicate a classification of instructions including the first instruction. The first processor is to indicate support for the unsupported instruction in response to a processor identification instruction. The system may also include an emulation module to emulate the instruction in response to the exception. The classification of instructions may be an extension to an instruction set architecture. The second processor may also comprise a register to store an address of a memory location, the second processor to store information regarding the first instruction in the memory location. The second processor may also comprise a register to store an indicator to indicate whether a virtual machine monitor or guest software is to handle the exception when generated within a virtual machine. The exception generation circuit may also be to generate the exception in response to a state management instruction to save or restore unsupported state information. The exception generation circuit may also be to determine whether to generate the exception in response to the state management instruction based on a privilege level of software including the state management instruction.

In this specification, operations in flow diagrams may have been described with reference to exemplary embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A processor comprising:
   an instruction decoder; and
   an exception generation circuit to, in response to the instruction decoder receiving an unsupported instruction, generate an exception and report an instruction classification value of the unsupported instruction, wherein the instruction classification value is to indicate which of plurality of extensions to an instruction set architecture includes the unsupported instruction.

2. The processor of claim 1, wherein the processor is a first processor in a system, the system also including a second processor, the second processor supporting the unsupported instruction.

3. The processor of claim 2, wherein the second processor is to indicate support for the unsupported instruction in response to a processor identification instruction.

4. The processor of claim 1, further comprising a register to store an address of a memory location, the processor to store information regarding the unsupported instruction in the memory location.

5. The processor of claim 1, further comprising a register to store an indicator to indicate whether a virtual machine monitor or guest software is to handle the exception when generated within a virtual machine.

6. The processor of claim 1, wherein the exception generation circuit is also to generate the exception in response to a state management instruction to save or restore unsupported state information.

7. The processor of claim 6, wherein the exception generation circuit is to determine whether to generate the exception in response to the state management instruction based on a privilege level of software including the state management instruction.

8. A method comprising:
    receiving, by a first processor in a system, a first instruction, the first processor having a first instruction set architecture;
    generating, by the first processor, an exception in response to determining that the first instruction is not in the first instruction set architecture; and
    reporting an instruction classification of the first instruction, wherein the instruction classification value is to indicate which of plurality of extensions to the first instruction set architecture includes the unsupported instruction.

9. The method of claim 8, further comprising determining that the first instruction is supported by a second processor in the system.

10. The method of claim 9, wherein determining that the first instruction is supported by the second processor includes issuing a second instruction to the second processor, the second instruction to enumerate supported instruction classifications.

11. The method of claim 9, further comprising migrating a thread including the first instruction to the second processor in response to the exception.

12. The method of claim 8, further comprising emulating the first instruction in response to the exception.

13. The method of claim 8, further comprising storing information regarding the first instruction in a memory location specified by an address in a register in the first processor.

14. The method of claim 8, wherein the exception is generated in a virtual machine, further comprising determining whether a virtual machine monitor or guest software is to handle the exception.

15. A system comprising:
    a first processor having a first instruction set architecture (ISA) including a first extension including a first instruction;
    a second processor having the first ISA not including the first extension, the second processor including:
    an instruction decoder; and
    an exception generation circuit to, in response to the instruction decoder receiving the instruction, generate an exception and report an instruction classification value of the instruction, wherein the instruction classification value is to indicate that the first extension includes the first instruction.

16. The system of claim 15, wherein the first processor is to indicate support for the first instruction in response to a processor identification instruction.

17. The system of claim 15, further comprising an emulation module to emulate the first instruction in response to the exception.

* * * * *